(12) United States Patent
Philip

(10) Patent No.: US 9,385,591 B2
(45) Date of Patent: Jul. 5, 2016

(54) OUTPUT RIPPLE VOLTAGE CONTROL FOR A CAPACITIVE DC/DC CONVERTER

(71) Applicant: NXP B.V., Eindhoven (NL)

(72) Inventor: Melanie Philip, Blainville (FR)

(73) Assignee: NXP B.V., Eindhoven (NL)

( * ) Notice: Subject to any disclaimer, the term of this patent is extended or adjusted under 35 U.S.C. 154(b) by 345 days.

(21) Appl. No.: 14/027,555

(22) Filed: Sep. 16, 2013

(65) Prior Publication Data

US 2014/0084890 A1   Mar. 27, 2014

(30) Foreign Application Priority Data

Sep. 21, 2012   (EP) ..................................... 12290312

(51) Int. Cl.
G06F 1/10   (2006.01)
H02M 3/07   (2006.01)
H02M 1/14   (2006.01)

(52) U.S. Cl.
CPC ................ *H02M 3/07* (2013.01); *H02M 1/146* (2013.01)

(58) Field of Classification Search
CPC ....................................................... G05F 1/10
See application file for complete search history.

(56) References Cited

U.S. PATENT DOCUMENTS

| 6,107,862 | A | 8/2000 | Mukainakano et al. |
| 6,169,444 | B1 | 1/2001 | Thurber, Jr. |
| 6,359,797 | B1 | 3/2002 | Bayer et al. |
| 7,375,992 | B2 | 5/2008 | Mok et al. |
| 7,633,778 | B2 | 12/2009 | Mok et al. |
| 8,860,500 | B2 * | 10/2014 | Sheng ....................... G06F 3/02 327/536 |
| 2008/0094041 | A1 | 4/2008 | Gerber |

(Continued)

FOREIGN PATENT DOCUMENTS

EP   1 067 659 A2   1/2001
EP   1 111 763 A2   7/2001

OTHER PUBLICATIONS

Wu, W.-C. et al. "Analysis of Charge Pumps Using Charge Balance", IEEE Power Electronics Specialist Conference, vol. 3, pp. 1491-1496 (Jun. 18, 2000).

(Continued)

*Primary Examiner* — Hai L Nguyen

(57) ABSTRACT

A switching direct current (DC)-to-DC converter includes a charge pump circuit with a flying capacitor (104) and a switching circuit (106). The switching circuit (106) has an ON resistance ($R_{on}$) and is configured and arranged to boost an input voltage ($V_{in}$) by operating in each of a charging mode (loading) during which charge is provided from the flying capacitor (104) to an output voltage ($V_{out}$) and a discharging mode (storing) during which charge is not provided from the flying capacitor (104) to the output voltage ($V_{out}$). A determination circuit (102) is configured and arranged to determine a ratio between a discharge rate (308) and a charge rate (310). The discharge rate (308) and the charge rate (310) both correspond to a rate of change for the output voltage of the switching DC-to-DC converter. An ON resistance circuit (102) module is configured and arranged to adjust the ON resistance ($R_{on}$) of the charging mode (loading) and to change the determined ratio to a target ratio.

15 Claims, 8 Drawing Sheets

(56) References Cited

U.S. PATENT DOCUMENTS

2008/0272833 A1    11/2008   Ivanov et al.
2009/0027022 A1     1/2009   Oyama et al.

OTHER PUBLICATIONS

Extended European Search Report for Patent Appln. No. 12290312.3 (Mar. 1, 2013).

Kosev, J. et al. "12V-to-15V PWM-Regulated Switched-Capacitor DC-to-DC Voltage Converter", 6 pgs, Faculty of Electrical Engineering, retrieved from the internet at: fett.tu-sofia.bg/.../..pwm-regulated switched-capacitor dc-to-dc voltage converter.pdf (2012).

Lee, H. et al. "A Switched-Capacitor DC-DC Converter with Pseudo-Continuous Output Regulation using a Three-Stage Switchable Opamp", 11 pgs, Hong Kong University of Science and Technology, retrieved from the internet at: repository.ust.hk/dspace/bitstream/1783.../200502ISSCC_pseudoSC.pdf (2005).

\* cited by examiner

OUTPUT RIPPLE VOLTAGE CONTROL FOR A CAPACITIVE DC/DC CONVERTER

CROSS-REFERENCE TO RELATED APPLICATIONS

This application claims the priority under 35 U.S.C. §119 of European patent application no. 12290312.3, filed on Sep. 21, 2012, the contents of which are incorporated by reference herein.

Direct current to direct current (DC-to-DC) power converters are used in many different devices and systems, and are commonly used in battery-driven, portable, and other high-efficiency systems. DC-to-DC converters can do one or more of decrease, increase (boost) or invert their output voltages (relative to an input/source voltage). Their ability to provide efficient and stable power is often a critical, if sometimes overlooked, component of many such systems. In some instances, significant amounts of additional circuitry, processing and design efforts are required to meet the system requirements. These requirements can include, but are not necessarily limited to, input voltage range, output voltage range, ripple current, power conversion efficiency and the stability of output voltage. In certain instances, DC-to-DC power converters can be designed to compensate for such requirements. For instance, additional filtering circuitry can be used to reduce ripple current. In other instances, the efficiency can be increased by changes to the switching frequency and/or to the effective internal resistances.

Various methods are used for DC-to-DC voltage conversion. Each method can have its respective benefits and disadvantages and can be selected based upon the particular of operating parameters and requirements/restrictions. The design of DC-to-DC power converters can vary depending upon the weight provided for the different parameters and/or restrictions. For instance, the small form factor of integrated circuit (IC) chip technology can be limited by the available chip area. This limitation can be relevant to the production cost, and can limit the value and quality factor of the passive components (e.g., as may be used for filtering). These limitations can have a significant impact upon the choice of the conversion method.

Aspects of the present disclosure are directed toward methods, devices and systems for DC-to-DC power conversion, and more particular aspects are directed toward the control of output voltage ripple.

Aspects of the present disclosure are directed to systems and methods useful for switching DC-to-DC power converters and toward control over the ripple of an output voltage thereof. These and other aspects of the present disclosure are exemplified in a number of illustrated implementations and applications, some of which are shown in the figures and characterized in the claims section that follows.

Embodiments of the present disclosure are directed toward switching DC-to-DC power converters with a boost charge pump. The switching DC-to-DC power converters can be configured and arranged to set and/or adjust their ON resistances based upon a number of parameters in order to control ripple in their output voltages.

Particular embodiments are directed toward a switching direct current (DC)-to-DC converter that includes a charge pump circuit with a flying capacitor and a switching circuit. The switching circuit has an ON resistance and is configured and arranged to boost an input voltage by operating in each of a charging mode and a discharging mode. Charge is provided from the flying capacitor to an output voltage during the charging mode and charge is not provided from the flying capacitor to the output voltage during the discharging mode. A determination circuit is configured and arranged to determine a ratio between a discharge rate and a charge rate, for the discharge mode and charge mode, respectively. The discharge rate and the charge rate both correspond to a rate of change for the output voltage of the switching DC-to-DC converter. An ON resistance circuit is module configured and arranged to adjust the ON resistance of the charging mode and to change the determined ratio to a target ratio.

Certain embodiments are directed toward a method for use with a switching direct current (DC)-to-DC converter that operates in a charging mode that has an ON resistance and a discharging mode. The method includes the determination of a ratio between a discharge rate and a charge rate. Each of the discharge rate and the charge rate correspond to a rate of change for an output voltage of the switching DC-to-DC converter, which is charged by at least one flying capacitor of the switching DC-to-DC converter. The rates also correspond to the discharging mode and the charging mode, respectively. The ON resistance of the charging mode can then be adjusted to change the determined ratio to a target ratio.

The above discussion is not intended to describe each embodiment or every implementation of the present disclosure. The figures, detailed description, and claims that follow more particularly exemplify various embodiments.

Aspects of the present disclosure may be more completely understood in consideration of the detailed description of various embodiments of the present disclosure that follows in connection with the accompanying drawings, in which.

Figure 1:
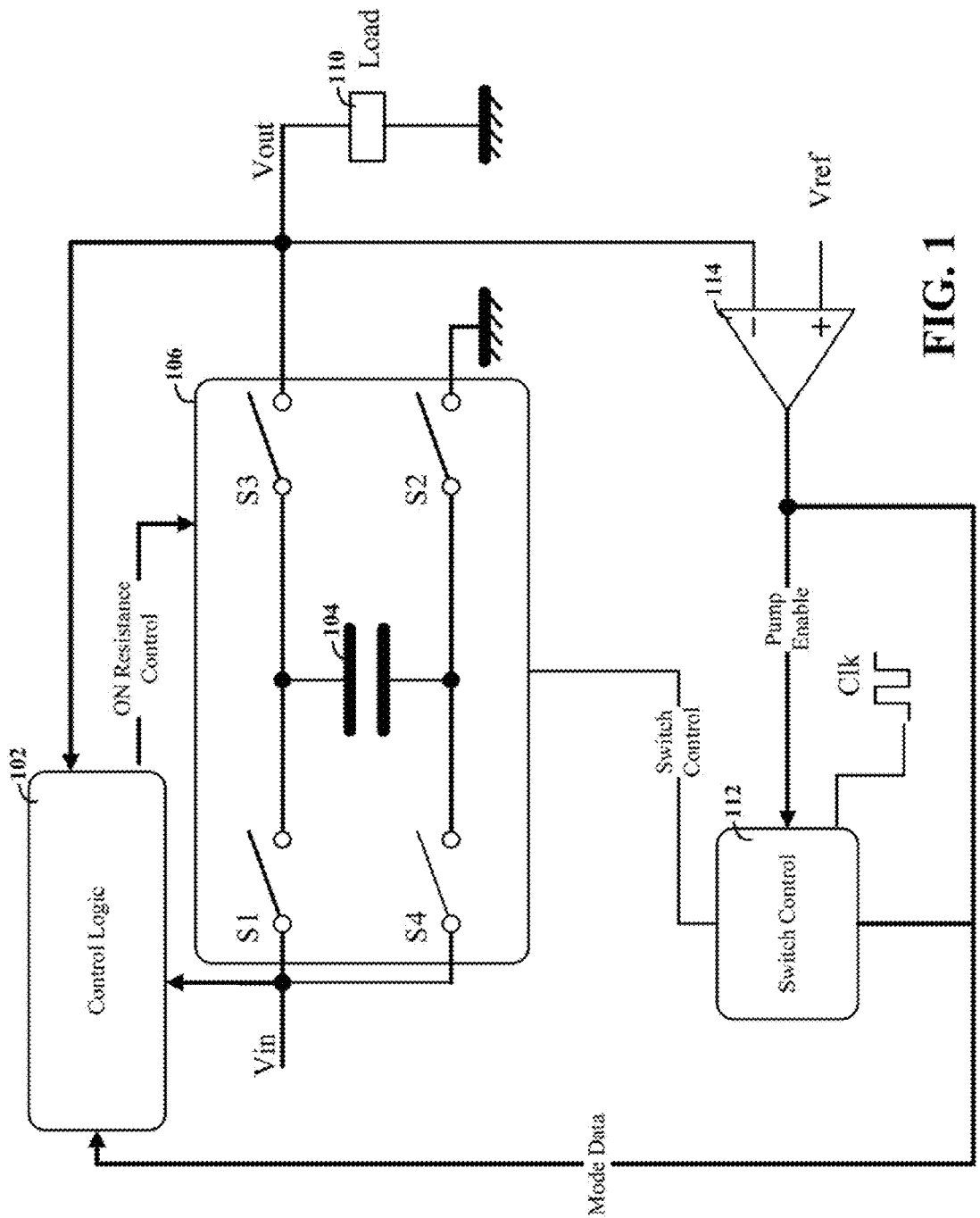
FIG. 1 depicts a block diagram for a switched capacitor DC-to-DC converter, consistent with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

Aspects of the present disclosure are believed to be applicable to a variety of different types of devices, systems and arrangements, including those that may involve the control of ripple voltages in a switched capacitor direct current DC-to-DC converter. While the present disclosure is not necessarily limited to such applications, various aspects of the invention may be appreciated through a discussion of various examples using this context.

Consistent with embodiments of the present disclosure, a method involves the use of a switched capacitor DC-to-DC converter that operates in a charging mode that has an ON resistance and in a discharging mode. As part of the method a ratio is (directly or indirectly) determined between a discharge rate (for the discharging mode) and a charge rate (for the charging mode) of the DC-to-DC converter. The rates correspond to a rate of change for an output voltage of the switching DC-to-DC converter. The DC-to-DC converter includes at least one flying capacitor that is used to charge the output voltage. In response to the determined ratio, the ON resistance of the charging mode is modified in order to change the determined ratio to a target ratio. The target ratio can be set according to a number of parameters of the system. For instance, one or more of these parameters can be relevant to the different operational modes of the DC-to-DC converter and to the corresponding effect on the output voltage and its ripple.

As discussed herein, a particular type of DC-to-DC converter is a switched capacitor DC-to-DC converter. Switched capacitive DC-to-DC converters can use "flying capacitor(s)." A switching circuit provides control over the connections to the flying capacitor. The switching circuit can allow the flying capacitor to be charged from the input voltage (during a first mode) and then to be discharged to the load (during a second mode), thus providing charge transfer and a controlled output voltage. In order to generate a higher output voltage from a lower input voltage, the flying capacitor can first be connected across the supply, charging it to the input voltage. The switching circuit can then place the flying capacitor in series with the input voltage and the load. Ignoring inefficiencies (such as leakage), this can effectively double the input voltage. By alternating between different modes, the switching circuit can control the output voltage level. This control can be in response to a comparison between the output voltage and a reference voltage.

The switching circuit can be designed to operate according to switching speed, which can be determined by a provided signal/clock. This switching clock can vary according to the particular application including, but not necessarily limited to, speeds ranging from a few kHz up to several MHz. Generally, the frequency can be selected as a tradeoff between different parameters, such as the amount of capacitance required (e.g., less charge is required for a shorter cycle) and switching losses (e.g., higher switching loss for higher frequencies).

The above example is but a basic example and more complex variations are possible. This can include the use of multiple flying capacitors. For instance, multiple stages (each having a respective flying capacitor) can be used to provide voltages that more than double the input voltage. Other variations are also possible, including the use of multiple flying capacitors in parallel, within the same stage.

Switched capacitive DC-to-DC converters can be particularly useful for their ability to function without a dedicated inductor. For this and other reasons, switched capacitive DC-to-DC converters can be well suited for integration on-chip and can often be implemented at relatively low cost. They can also offer a fast transient response and can be designed to operate over a wide range of input voltages, output voltages and/or load values.

Embodiments of the present disclosure are directed toward a DC-to-DC converter that is designed to adjust internal operating parameters to control ripple current on its output voltage. For an ideal DC-to-DC converter, the output ripple voltage increases as a function of the comparator hysteresis. More particular aspects relate to the recognition that the output ripple can change for different values of the input supply voltage, $V_{IN}$. For instance, experimental tests suggest that for a DC-to-DC converter with a dynamic input voltage range between $V_{IN}$=3V and $V_{IN}$=4.9V, the output ripple can be nearly twice as high for the upper voltage range (e.g., approximately 108 mV vs. 64 mV). Other aspects relate to the recognition (and experimental results suggesting) that frequency (noise) characteristics caused by the output ripple can be improved upon. This is especially true for lower frequency components of such noise, which can be effectively shifted to higher frequencies. It has been discovered that monitoring and adjusting a ratio between a charge and discharge rate of the output voltage can be useful for these and other aspects.

The various embodiments discussed herein can be used in combination with additional conditioning and/or filtering components; however, various aspects and embodiments can facilitate the use of DC-to-DC converters that can use less expensive conditioning/filtering circuits or none at all.

For instance, aspects of the present disclosure are directed toward a boost converter with low output ripple that avoids the use of an inductive component as a storage element for a pump circuit of the DC-to-DC conversion and thereby uses a capacitive element for storage. Such inductors can often be undesirable in both terms of their size and price. Other embodiments of the present disclosure are also directed toward a boost converter that provides low output ripple using a capacitive pump circuit, while avoiding the use of an additional linear regulator for rejecting capacitive DC-to-DC output noise. The absence of linear regulators can be particularly useful for reducing the required silicon die area and/or for using a package with a lower pin number.

Certain embodiments are directed toward the reduction of output noise at lower frequencies. For instance, low frequency noise can be a contributor in the performance degradation of applications such as near-field communications (NFC). Such embodiments can be particularly useful for providing power to an NFC transmitter by reducing supply voltage noise in the relevant data frequency range(s). For instance, NFC products can be used in mobile applications that use amplitude modulation of a 13.56 MHz carrier frequency. The corresponding frequency for the data transfer is lower than 1 MHz. Such applications can sometimes be subject to dynamic changes in the input voltage, such as a battery voltage burst resulting from activation of cellular (e.g., GSM) circuitry. This can sometimes result in corresponding noise being generated at frequencies around those used for the data transfer. The reducing output voltage noise at these relatively low frequencies can therefore be particularly useful.

Other embodiments recognize that control of the ON resistance can be useful for increasing the operational range of the input voltage. This can be useful, as a non-limiting example, to allow for increased battery operation voltage range (e.g., allowing the device to operate when the battery voltage drops due to low power). Further embodiments recognize the potential to reduce peak current seen on the input voltage $V_{IN}$.

Certain embodiments are directed toward controlling the ON resistance by modifying the supply voltage level provided to the circuit driving the power switches. For instance, the power switches could be implemented using power metal-oxide-semiconductor field-effect transistors (MOSFETs), where a lower supply voltage can induce a higher ON resistance and a higher supply voltage can induce a lower ON resistance. Other embodiments are directed toward the use of a variable power switching area (e.g., implemented inside of a chip).

Turning now to the figures, FIG. 1 depicts a block diagram for a switched capacitor DC-to-DC converter, consistent with embodiments of the present disclosure. The switched capacitor DC-to-DC converter produces an output voltage ($V_{out}$) from an input voltage source ($V_{in}$). The output voltage is set according to a reference voltage ($V_{ref}$). A comparator circuit 114 can generate a control signal in response to a comparison between $V_{ref}$ and $V_{out}$. This comparator circuit forms part of a regulation loop that functions to achieve and maintain the voltage of $V_{out}$ at the desired level.

When enabled by the control signal, switching control circuit 112 can then control how and when power switches 106 (e.g., S1-S4) are enabled. For instance, switches S1 and S2 can be closed to store charge on flying capacitor 104. During this mode/phase, charge stored on the output $V_{out}$ is discharged. Thus, this mode can be referred to as a fly-storing mode (relative to the flying capacitor) and/or a discharge mode (relative to the output/load). Switches S3 and S4 can then be closed to transfer power from flying capacitor 104 to $V_{out}$ and load 110. Thus, this mode can be referred to as a loading mode and/or a charge mode. By repeating this process, the voltage on $V_{out}$ can be effectively doubled relative to the voltage on $V_{in}$. When not enabled by the control signal, the switch control can disable switching between the modes. This can occur in response to the voltage exceeding a threshold and thereby allow the voltage to return to an acceptable level. This mode can therefore be referred to as a stoppump mode.

Switching circuitry 106 can employ various different solutions having different ranges of complexity and corresponding function. For instance, multiple switching stages can be used to increase the output voltage range for $V_{out}$. In other instances, a step-up converter can use a different switched/flying capacitors circuit, such as a series-parallel converter. The series-parallel converter includes an additional (output) capacitor that is placed in series with the flying capacitor during the discharge phase. These and other reasonable variations are contemplated for use in, and with, different embodiments of the present disclosure.

The ON resistance of switching circuitry 106 can be measured as the effective resistance between the flying capacitor 104 and $V_{out}$ and/or load 110. Having a low ON resistance for switching circuitry 106 is desirable for many applications. For instance, a high ON resistance can reduce the capability of the switching circuitry. This can include, for instance, limits on the output voltage and on the power provided to the load. For instance, a DC-to-DC converter's ability to achieve/maintain a target voltage when the load exceeds a threshold can be limited by the effective ON resistance.

Aspects of the present disclosure recognize that control over the ON resistance can be useful for reducing ripple in the output voltage ($V_{out}$). In particular, the ON resistance can be adjusted using control logic 102. This adjustment can be made responsive to a number of different parameters including, but not necessarily limited to, $V_{out}$, $V_{in}$, the "Pump Enable" control signal and/or switching control signals. For instance, the ON resistance can be adjusted as a function of the discharge rate that occurs on $V_{out}$ during the discharge phase, which can also be determined using control logic 102, e.g., using a determination circuit module. The ON resistance can thereby be varied according to the load. In certain instances, the ON resistance can be adjusted as a function of a charge rate that occurs on $V_{out}$ during the charge phase. This can be particularly useful as the charge rate can vary significantly according to different usage parameters.

Certain embodiments are directed toward using control logic 102 to vary the ON resistance as a function of a ratio between the charge rate and the discharge rate. Such embodiments can be based upon the realization that the output ripple can vary according to the input voltage. For instance, DC-to-DC converters can be configured with hysteresis in the regulation loop. Thus, the pump can turn on at a lower voltage than that which the pump turns off. Although an ideal DC-to-DC converter can have an output ripple voltage that is equal to the comparator hysteresis, it has been discovered that the output ripple voltage can vary according to the input voltage ($V_{in}$) for actual DC-to-DC converter implementations. This discovery is based upon the recognition that there is a non-zero response time for the regulation loop. As such, the output voltage (and the corresponding ripple voltage) will continue to increase from when the output voltage first exceeds the upper hysteresis voltage level. Thus, the output ripple is a function of the response time of the regulation loop and the charge rate. The charge rate can, in turn, be a function of the input supply voltage, $V_{IN}$.

Figure 2:
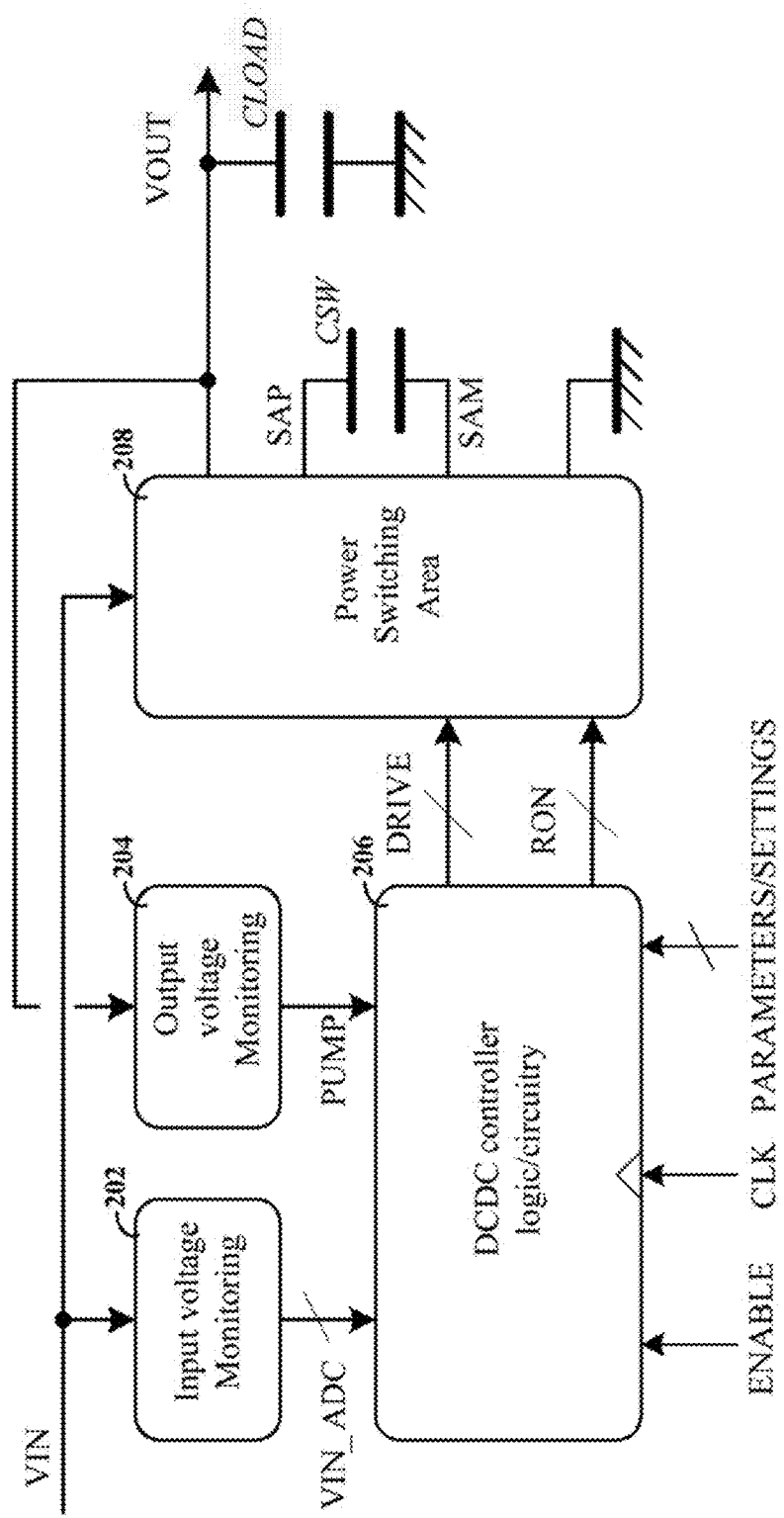
FIG. 2 depicts a block diagram of a system for controlling the ON-resistance in a DC-to-DC converter, consistent with embodiments of the present disclosure.

FIG. 2 depicts a block diagram of a system for controlling the ON-resistance in a DC-to-DC converter, consistent with embodiments of the present disclosure. The DC-to-DC converter includes a flying capacitor ($C_{SW}$) that is charged/discharged based upon a configuration of power switches within power switching area 208. In this manner, the output voltage ($V_{out}$) can be regulated to a desired voltage, e.g., by providing charge to an output load ($C_{load}$). The phase/mode of the DC-to-DC converter is therefore set according to control signals (DRIVE) provided to the power switching area 208. Power switching area 208 can include a number of different power switches (e.g., power MOSFETs). The resistances of the switches directly affect the value for the ON resistance ($R_{ON}$).

DC-to-DC controller logic/circuitry 206 can be configured to generate the control signals (DRIVE) in response to the output voltage ($V_{out}$). Accordingly, output voltage monitoring circuitry 204 can be used to monitor and detect the output voltage. For instance, the output voltage monitoring circuitry 204 can be implemented using analog-to-digital converter (ADC) circuitry. The output voltage monitoring circuitry 204 can also compare the output voltage to a reference voltage and provide a pump enable/disable signal (PUMP).

The switching can operate according to a certain switching speed, which can be set by (or derived from) an input clock signal (CLK). This switching speed can be used to control the rate of transitions between the charging and discharging modes, when the pump is enabled by the PUMP signal. The PUMP signal, however, can override this switching by disabling the switching between modes and placing the DC-to-DC converter in a stoppump mode during which the output voltage is discharging. The stoppump mode can be entered in response to the output voltage monitoring circuitry 204 detecting that the output voltage has exceeded an upper hysteresis voltage and can be exited upon detecting that the output voltage has gone below a lower hysteresis voltage.

DC-to-DC controller logic/circuitry 206 can also be configured to control the ON resistance ($R_{ON}$) for the power switching area 208. This control can be made in response to determining a ratio between charging and discharging rates for $V_{out}$. The charging rate corresponds to the PUMP being enabled and the flying capacitor being connected to the output and the discharging rate corresponds to the flying capacitor not being connected to the output. This ratio can be determined using direct measurements the corresponding voltages or determined/inferred using other inputs.

In one instance, DC-to-DC controller circuitry 206 can monitor the output voltage and current over time (over a single phase or clock cycle) and then correlated to the corresponding discharge/charge modes. From this information, the circuitry 206 can determine/calculate the respective rates. Such direct measurement, however, is not without certain considerations. For instance, the output voltage can be subject to a variety of noise sources including dynamic changes to the load. This can complicate/frustrate attempts to measure the charge/discharge rates. Moreover, calculating charge/discharge rates from measured data points can involve the use of processing circuitry and (current) sensors that can add to the cost (whether the cost is for additional processing hardware or by tying up additional processing resources for existing hardware).

In view of the above considerations, certain embodiments are directed toward indirectly determining the corresponding rates. In a particular instance, the rates can be determined using a set of input parameters/settings. These parameters can then be used to calculate the charge rates for different ON resistance values. For example, the parameters can include, but are not necessarily limited to, values for the flying capacitor, output load (capacitance/current draw), and the desired output voltage ($V_{out}$). Moreover, the input voltage ($V_{in}$) can also be used. These parameters can be provided by a system designer. For instance, the DC-to-DC converter can be located on a chip of an IC package. The system designer can select appropriate values for the flying capacitor, the desired $V_{out}$ and the expected load parameters. These values can then be provided to the chip containing the DC-to-DC converter (e.g., by loading the values into a memory).

DC-to-DC controller circuitry 206 can be implemented using a variety of different circuits including, but not necessarily limited to, one or more of digital signal processors (DSPs) with specialized programming, programmable logic devices, specially designed logic circuits and discreet logic/circuit components. DC-to-DC controller circuitry 206 can also be configured to provide functions in addition to the ratio determination and to switch control.

For applications in which the input voltage can vary, input voltage monitoring circuitry 202 can provide relevant data. This input voltage monitoring circuitry 202 is depicted using an analog-to-digital converter (ADC) (e.g., a flash ADC) that converts the input voltage $V_{in}$ into a digital signal for the DC-to-DC controller block. The input voltage monitoring circuitry 202 can also use different types of ADCs or analog monitoring/detection circuitry.

As discussed in more detail herein, these values can be used to determine a desired ON resistance. This ON resistance can thereby be selected so as to achieve a desired ratio between the charge rate and the discharge rate for corresponding modes of the DC-to-DC converter.

In other instances, the ratio between the discharge and charge rates can be inferred from other data points. For instance, the timing between the different modes of the DC-to-DC converter can be used to adjust the ratio using different values for the ON resistance. Examples of such embodiments are discussed in more detail herein.

Figure 3:
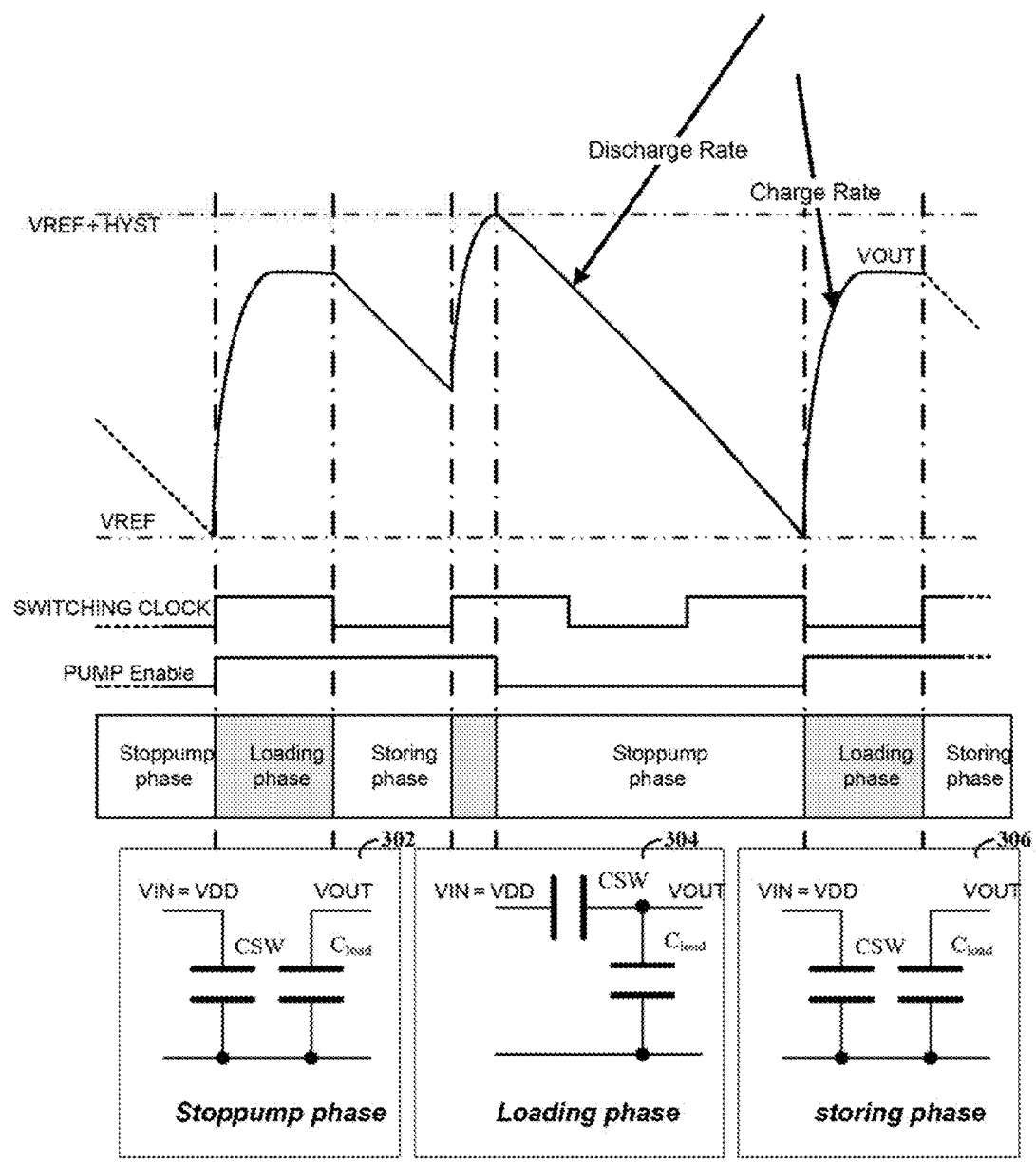
FIG. 3 depicts several mode/phases and an associated timing diagram, consistent with embodiments of the present disclosure.

FIG. 3 depicts several mode/phases and an associated timing diagram, consistent with embodiments of the present disclosure. The three phases/modes, stoppump, loading and storing, correspond to different states of the power switches of the DC-to-DC converter. The effective circuits for the corresponding phases are shown in diagrams 302, 304 and 306, respectively. Although the effective circuits for each of diagrams 302 and 306 are the same, the respective phases are readily distinguishable. In particular, the stoppump phase is present irrespective of the state for the switching clock, whereas the storing phase corresponds to the presence of the pump enable signal and the state of the switching clock.

When the pump is enabled, the DC-to-DC converter alternates between the loading and storing phases according to transitions of the switching clock. In the storing phase, switches S1 and S2 (with reference to FIG. 1) are closed (conducting) and switches S3 and S4 are open (non-conducting). This causes the flying capacitor ($C_{SW}$) to charge up to VIN in the first half cycle of the switching clock period. In the second half of the cycle, the storing phase is entered and S3 and S4 are closed while S1, S2 are open. During the storing phase, the negative terminal of $C_{SW}$ is connected to VIN and the positive terminal is connected to $V_{OUT}$. If the voltage at the output ($C_{LOAD}$) is smaller than the voltage of the flying capacitor ($C_{SW}$), charge flows from $C_{SW}$ to $C_{LOAD}$.

While the pump enable signal is active, storing phase and loading phase alternate (according to the switching clock) to "pump" the output voltage until it reaches a targeted value. This pumping action is then stopped by deactivating the PUMP enable signal, to enter the stoppump phase. In response to $V_{OUT}$ going below a reference voltage, the pumping phases can then be resumed by alternating the storing and loading phases.

For particular embodiments, the output voltage is regulated within a voltage window by using a voltage hysteresis between the voltages used to control the PUMP enable signal. As depicted in FIG. 3, $V_{OUT}$ is regulated between $V_{REF}$ and $V_{REF}$+HYST. The threshold voltage for $V_{OUT}$ rising edge is $V_{REF}$+HYST, the threshold voltage for falling edge is $V_{REF}$. The corresponding charge 308 and discharge rates 310 are indicated by the arrows.

Figure 4:
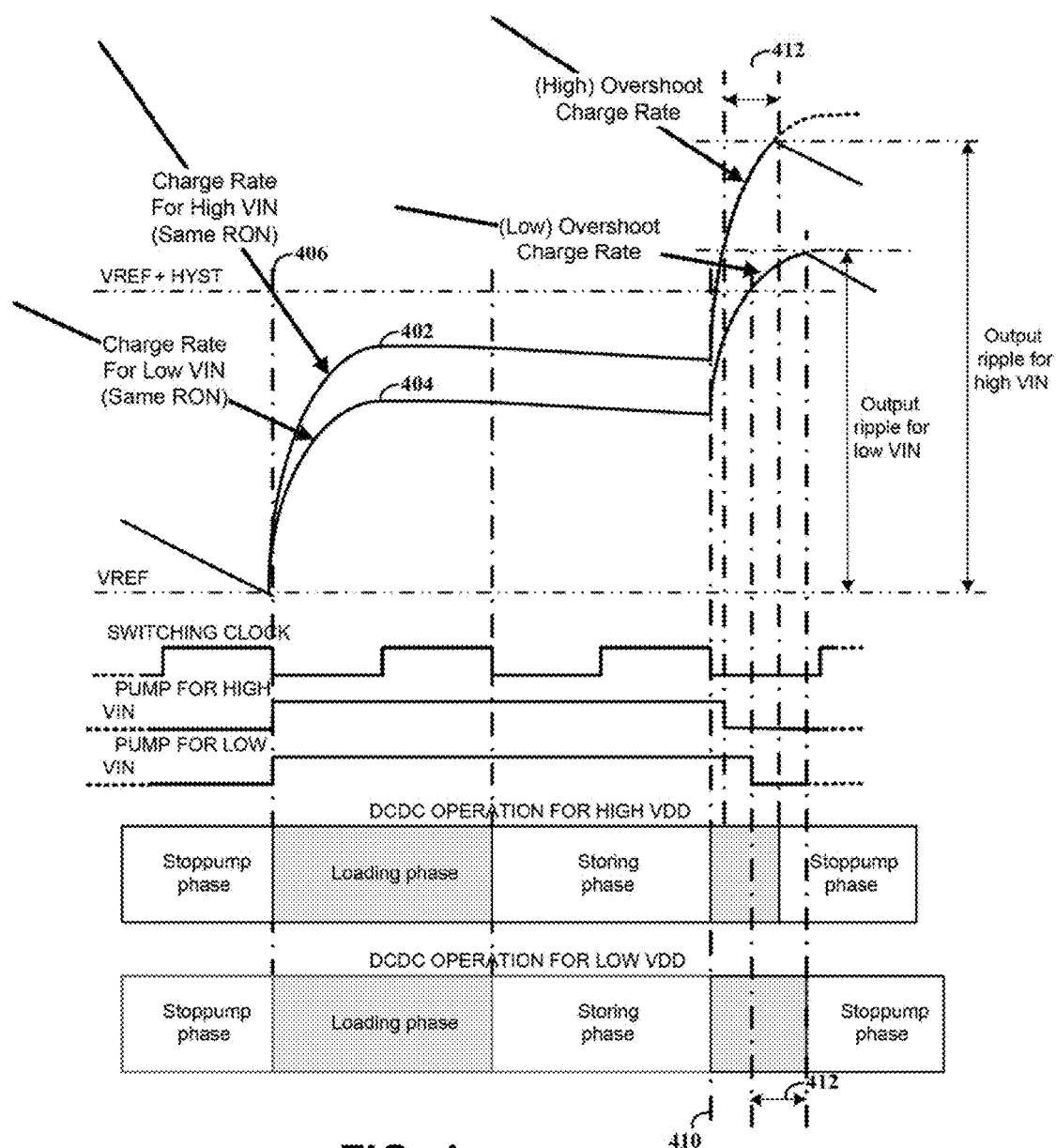
FIG. 4 depicts a timing diagram showing potential voltage overshoot for different values of input voltage, consistent with embodiments of the present disclosure.

FIG. 4 depicts a timing diagram showing potential voltage overshoot for different values of input voltage, consistent with embodiments of the present disclosure. Two lines represent output voltages for a high (402) and low (404) input voltage ($V_{in}$). At time point 406, the output voltage reaches the reference voltage ($V_{REF}$) and the pump is enabled. The DC-to-DC converter then enters the loading phase causing the output voltage to increase. Both curves 402 and 404 depict situations where voltage on output reaches the voltage on the flying capacitor. At this point, the output voltage begins to decrease. At time point 408, the DC-to-DC converter enters the storing phase. At time point 410, the DC-to-DC converter again enters the loading phase. During this second loading phase, the output voltage for both the low $V_{in}$ and high $V_{in}$ reaches the hysteresis level ($V_{ref}$+HYST) at which the stoppump phase is triggered for the DC-to-DC converter. Time delay 412, however, represents a regulation loop delay between the detection of this event and the actual reconfiguration of the switches for the stoppump phase. This delay results in a significant overshoot of the reference voltage. As shown by the respective charge rates and waveforms for the high 402 and low 404 $V_{in}$ values, the respective voltage peak for these two input $V_{in}$ values is different. This results in a different output ripple for different values of $V_{in}$.

Moreover, this overshoot problem can be worsened due to the relatively sharp charge rate during the initial/early portion of a particular loading phase. This is due to the instantaneous charge rate (as opposed to the charge rate over the loading phase) gradually decreasing over the loading phase. As used herein and unless otherwise specified, the charge rate refers to the charge rate relative to the time period of a particular phase, during which the instantaneous charge rate can vary. Embodiments of the present disclosure are directed toward a system designed to charge the complete regulation window range (voltage difference between $V_{ref}$ and $V_{ref}$+HYST) in a single loading phase of a pumping sequence. In doing so, the effective charge rate during the overshoot phase can be reduced.

Figure 5:
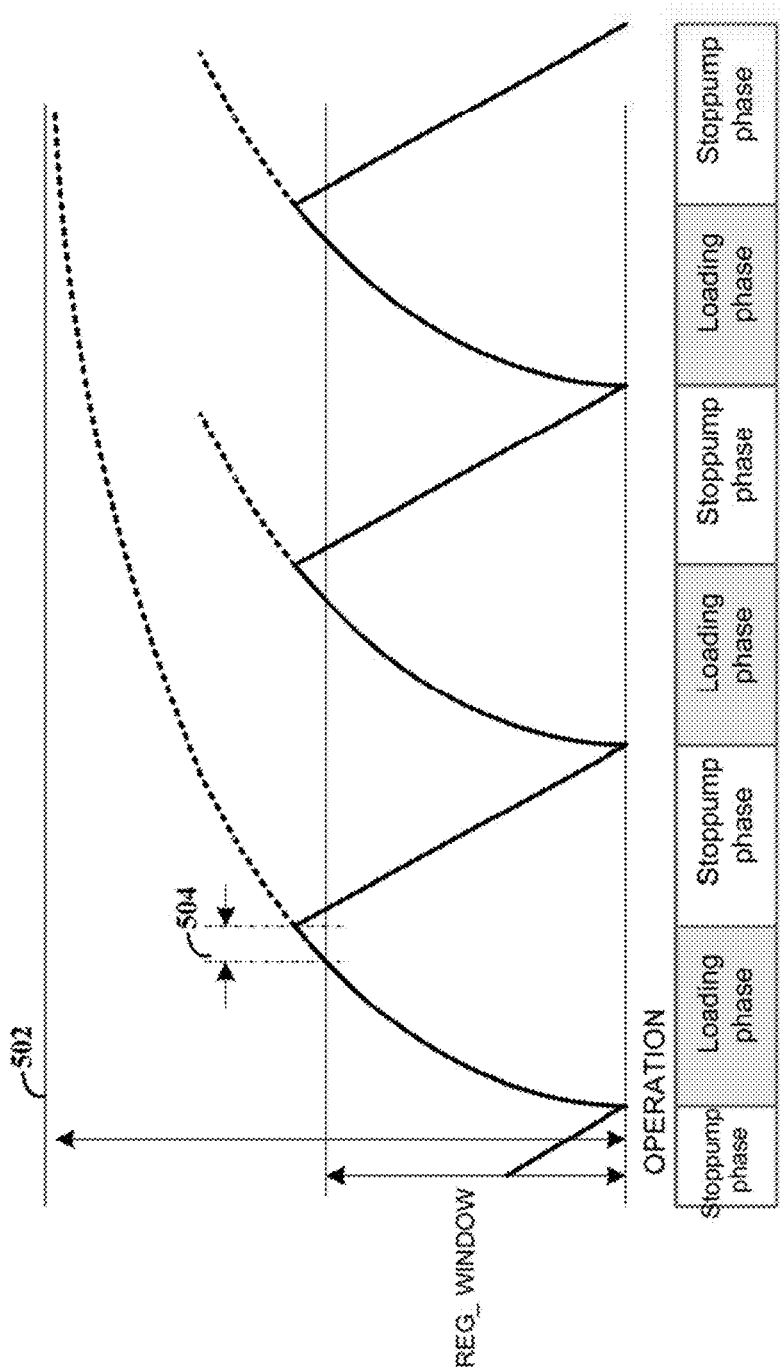
FIG. 5 depicts a timing diagram for a DC-to-DC converter with a controlled ON-resistance, consistent with embodiments of the present disclosure.

FIG. 5 depicts a timing diagram for a DC-to-DC converter with a controlled ON-resistance, consistent with embodiments of the present disclosure. Voltage level 502 represents the voltage step limit that is irrespective of switching clock speed. This level corresponds to the output voltage level at which the voltage on the flying capacitor will be equal to that of the output voltage. The regulation window corresponds to the voltage difference between $V_{ref}$ and $V_{ref}$+HYST.

As shown by the timing diagram, the DC-to-DC converter is configured to charge the entire regulation window in a single loading phase. In this manner, the stoppump phase is initiated after each loading phase. The DC-to-DC flying capacitor remains above $V_{OUT}$ during the entire phase. This allows for a pseudo continuous conduction through the flying capacitor (e.g., Vout does not=the voltage of the flying capacitor).

The timing diagram also shows that the DC-to-DC converter is configured with the charge rate and the discharge rate being close to the same value. Thus, the ratio between these two rates is close to 1 to 1. Consistent with embodiments of the present disclosure, this ratio can be set and controlled by adjusting the ON resistance of the DC-to-DC converter.

Time delay 504 represents a regulation loop delay. The resulting overshoot is dependent upon the charge rate over the time delay period. By adjusting the ON resistance, this overshoot will be maintained at a relatively small value for different values of the input voltage ($V_{in}$).

Particular embodiments are based upon determining the desired ON resistance from one or more parameters of the system. Without being limited thereto, the following example is helpful for understanding how such determinations can be carried out. For instance, the output $V_{out}$ rising slope is dependent upon the load capacitance ($C_{load}$) and the ON resistance ($R_{on}$) of the two DC-to-DC power switches:

$$V_{out}(t)|_{rising} = \Delta V \left(1 - e^{\frac{-t}{2 \times R_{on} \times C_{LOAD}}}\right)$$

For operation over the regulation window (REG_WIND), $V_{OUT}$ rising time is:

$$t_{rise} = -2 \times C_{load} \times R_{on} \times \ln\left(1 - \frac{\text{REG\_WIND}}{\Delta V}\right)$$

The $V_{OUT}$ falling slope is dependent upon the load capacitor ($C_{LOAD}$) and the load current ($I_{LOAD}$) over the regulation window (REG_WIND):

$$t_{fall} = \frac{C_{load} \times \text{REG\_WIND}}{I_{load}}$$

The ratio between $V_{OUT}$ rising time and $V_{OUT}$ falling time is represented by the term "$\alpha_{ccm}$":

$$\alpha_{ccm} = \frac{t_{fall}}{t_{rise}}$$

Using the above equations, $\alpha_{ccm}$ can be expressed, in terms of various design variables/parameters, as follows:

$$\alpha_{ccm} = -\frac{\text{REG\_WIND}}{2 \times R_{on} \times I_{load} \times \ln\left(1 - \frac{\text{REG\_WIND}}{\Delta V}\right)}$$

In order to maintain the DC-to-DC converter in a pseudo continuous conduction mode (where the flying capacitor is not discharged to the output voltage), a desired ratio can be maintained between $t_{rise}$ and $t_{fall}$ over the load current and supply voltage range. In order to keep the ratio $\alpha_{ccm}$ stable over the operating conditions for the DC-to-DC converter, $R_{on}$ can be set according to the following:

$$R_{ON} = -\frac{\text{REG\_WIND}}{2 \times \alpha_{ccm} \times I_{LOAD} \times \ln\left(1 - \frac{\text{REG\_WIND}}{\Delta V}\right)}$$

Using a capacitive doubler in steady state, $\Delta V$ at the first pumping sequence can be expressed as:

$$\Delta V = (2 \times V_{IN} - V_{OUT}) \times \frac{C_{sw}}{C_{sw} + C_{load}}$$

Setting the capability for covering $V_{OUT\_REG}$ in one loading sequence, $R_{on}$ is a function of $V_{IN}$:

$$R_{ON} = -\frac{\text{REG\_WIND}}{2 \times \alpha_{ccm} \times I_{LOAD} \times \ln\left(1 - \frac{C_{sw} + C_{load}}{C_{sw}} \times \frac{\text{REG\_WIND}}{2 \times V_{IN} - V_{OUT}}\right)}$$

For low output voltage window, (2×REG_WIND)<<(2×$V_{IN}$−$V_{OUT}$), and $C_{SW}$≤$C_{LOAD}$, $R_{ON}$ can be determined as follows:

$$R_{ON} \approx \frac{2 \times V_{IN} - V_{OUT}}{\alpha_{ccm} \times I_{LOAD}} \times \frac{C_{sw}}{C_{sw} + C_{load}}$$

The DC-to-DC converter can use such calculations to adjust a programmable ON resistance ($R_{on}$) of the power transistors. $R_{on}$ can therefore be modified in response to a sensed input voltage ($V_{in}$) and to a sensed load current ($I_{load}$).

Figure 6:
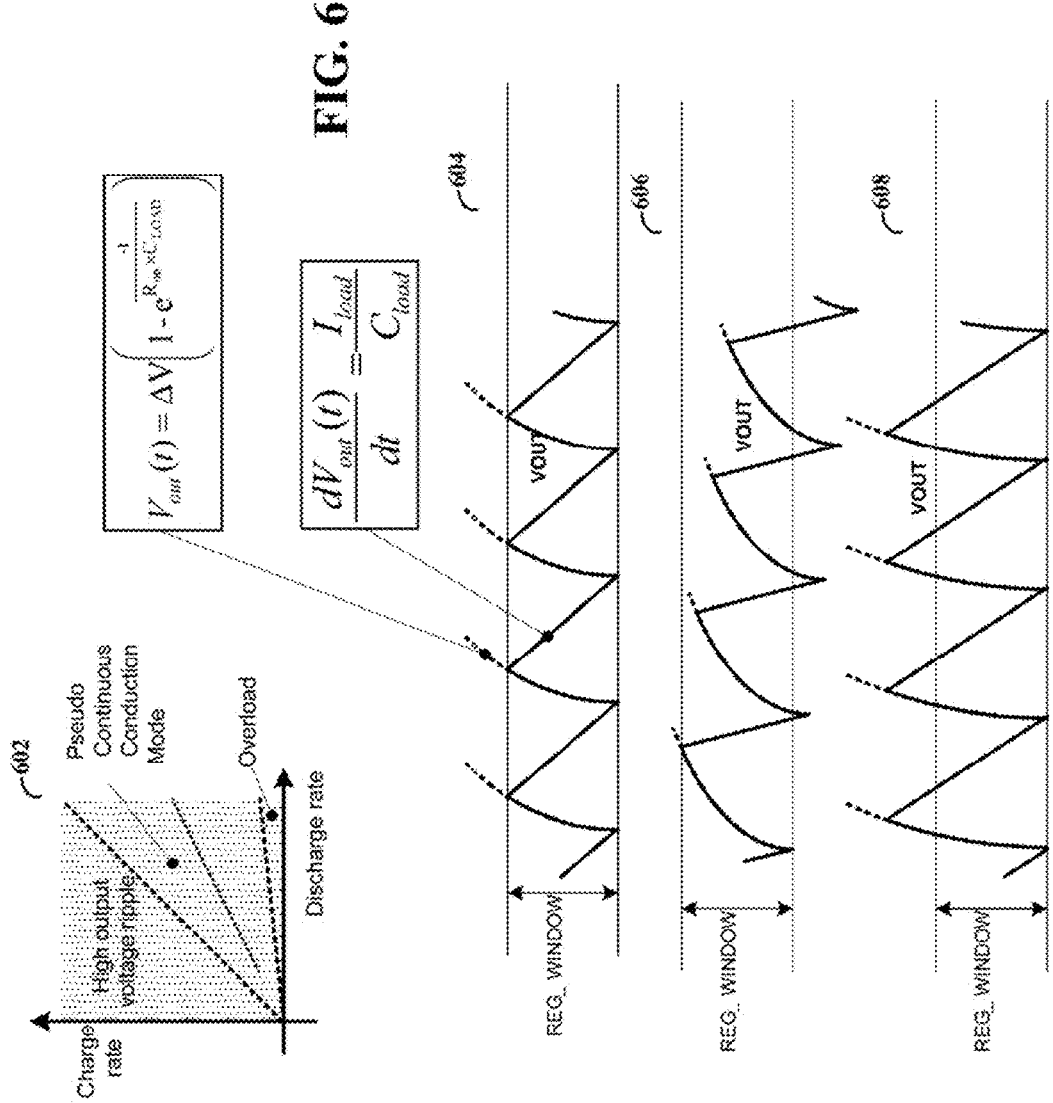
FIG. 6 depicts diagrams for different charge/discharge ratios, consistent with embodiments of the present disclosure.

FIG. 6 depicts diagrams for different charge/discharge ratios, consistent with embodiments of the present disclosure. Diagram 602 depicts the charge rate (vertical axis) vs. discharge rate (horizontal axis). The diagram dissects the possible ratios between these two rates into three different sections, a high output ripple section, a pseudo continuous conduction section and an overload section. These sections correspond to timing diagrams 608, 604 and 606, respectively.

Timing diagram 604 shows that for ratios near 1:1 the overshoot for the DC-to-DC converter is relatively low. As shown by diagram 602, the charge rate can be set based upon the current discharge rate, and therefore the relationship between the output ripple and the input voltage can be lessened or removed. Without adjustments to the ON resistance, an increased input voltage ($V_{in}$) can result in a corresponding increase in output ripple, as shown by diagram 608. Generally speaking, a lower charge rate (and corresponding high ON resistance) will result in a lower output ripple. Timing diagram 606 shows a situation in which the charge rate is insufficient to keep up with the output load. In such a situation, the DC-to-DC converter may be unable to maintain the desired output voltage due to the load discharging more charge than can be provided during the charge phase. Accordingly, aspects of the present disclosure are directed toward setting the ratio between the charge and discharge rates within an acceptable range.

Figure 7:
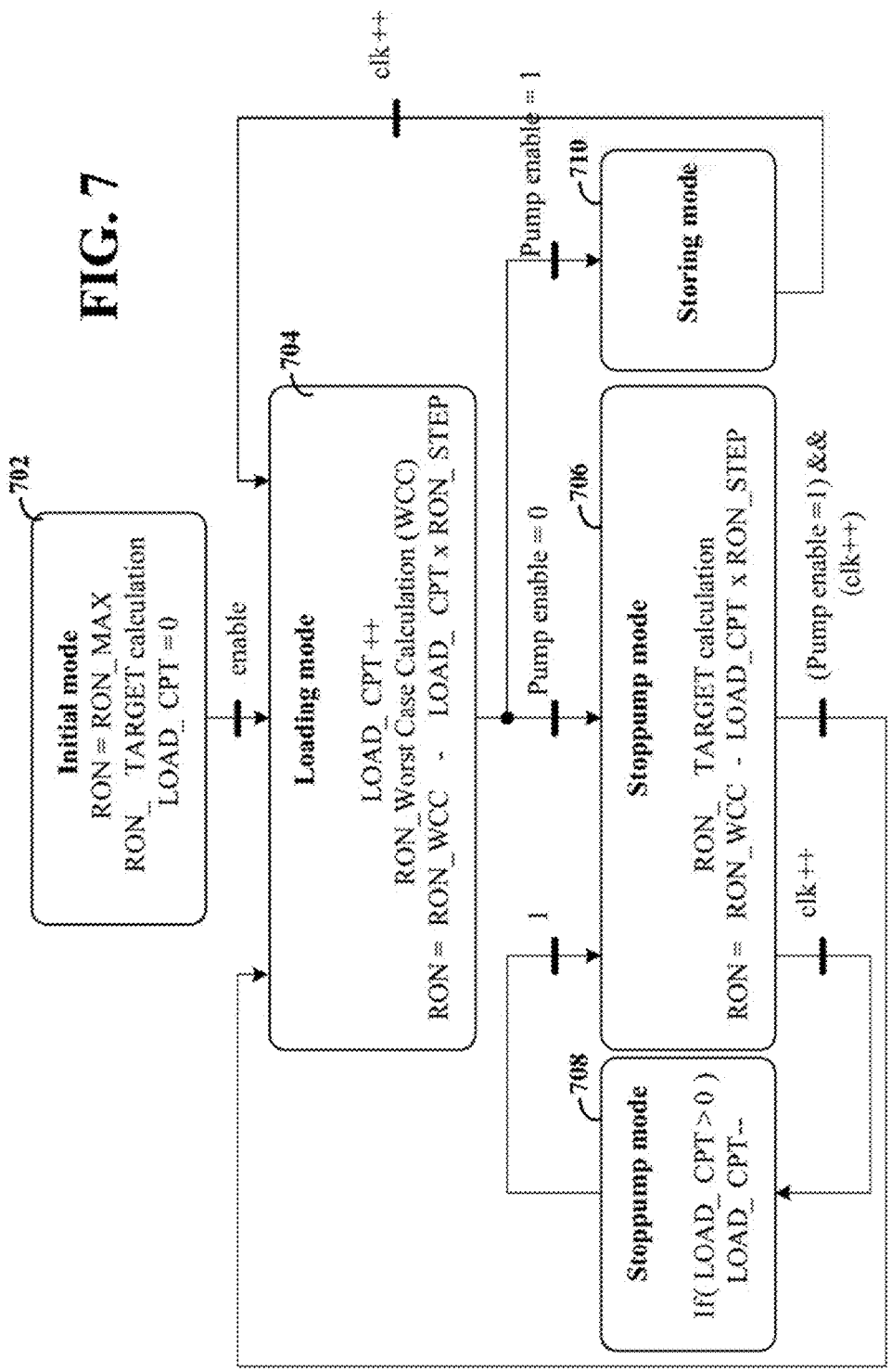
FIG. 7 depicts a state diagram for determining ON resistance using DC-to-DC converter state information, consistent with embodiments of the present disclosure.

FIG. 7 depicts a state diagram for determining ON resistance using DC-to-DC converter state information, consistent with embodiments of the present disclosure. The state machine of FIG. 7 can be particularly useful for determining the ON resistance without the use of a current sensor to detect the current drawn by the load. During the initial state 702, the actual on resistance ($R_{on}$) can be set to a first value. In certain instance, this value can be a maximum value ($R_{on\_max}$) for the ON resistance, where the maximum value represents a high resistance for the power transistors. Thus the initial load state can provide a low charge rate, which can be beneficial for allowing for a gradual increase for the charge rate (and avoiding unnecessarily high output ripple upon startup). The DC-to-DC converter then adjust the actual $R_{on}$ value down from this value until either a lower limit is reached or the mode information indicates a desired $R_{on}$ value has been reached for the load current.

As part of the transition to loading state 704, the DC-to-DC converter is enabled. In the loading state, an ON resistance can be calculated for the worst case load current ($R_{on\_wee}$). For instance, the value for $R_{on\_wee}$ can be calculated using the above formula and parameters provided by a system designer. These parameters can include the capacitance value for the load capacitor, the maximum current draw of the load, and the size of the regulation window. Assuming that all other parameters remain unchanged, the use of the maximum current draw in this calculation results in what is likely to be the lowest (worst case) ON resistance value required for the system (and correspondingly the highest charge rate). The actual $R_{on}$ value for the DC-to-DC converter can then be set to this calculated value.

The state diagram describes how the actual $R_{on}$ value can then be modified to reduce the charge rate based upon detecting the modes of the DC-to-DC converter. In particular, the detection of whether the DC-to-DC converter enters the stoppump mode or the storing mode can indicate how the actual $R_{on}$ value should be modified. For instance, the loading mode 704 can be exited in response to either the output voltage exceeding the hysteresis reference voltage (to enter the stoppump mode 706) or in response to the clock (clk) signal event (to enter the storing mode 710). Each of these events (stoppump mode 706 and storing mode 710) signifies that a different change should be applied to the $R_{on}$ value.

If the storing mode 710 is entered, this may indicate that the charge rate is high because the DC-to-DC converter was unable to charge the complete regulation window range (voltage difference between $V_{ref}$ and $V_{ref}$+HYST) in a single loading phase of a pumping sequence. This suggests that the actual $R_{on}$ value may be too high. Accordingly, a counter value (LOAD_CPT) can be incremented either in response to entering/exiting the storing mode 710 or upon entering the loading mode 704 (as depicted). This counter value can represent a deviation from the $R_{on\_wee}$ and can be incremented repeatedly to continually reduce the actual $R_{on}$ value. The storing mode 710 is exited upon a clock event (e.g., a clock edge).

Entering the stoppump mode 706 can indicate that the DC-to-DC converter was able to charge the complete regulation window range in a single clock cycle. Accordingly, the counter value (LOAD_CPT) can be increased in response to the DC-to-DC converter returning to the loading mode 704. If, however, the DC-to-DC converter is lightly loaded and has low load current, then the discharge rate may not be sufficient to discharge the complete regulation window range in a single clock cycle. Thus, stoppump mode 708 can be used to decrement the counter value and thereby increase the $R_{on}$ value.

Accordingly, while the DC-to-DC converter remains in the stoppump mode 708, the actual $R_{on}$ value is incremented until the maximum value $R_{on\_max}$ is reached. When the DC-to-DC converter enters the loading mode 704, the actual $R_{on}$ value is decremented until the $R_{on\_wee}$ value is reached. With such operation, the DC-to-DC converter can converge on a desired actual $R_{on}$ value for the load current. This can be particularly useful for implementations that do not use a current sensor for the load output.

Figure 8:
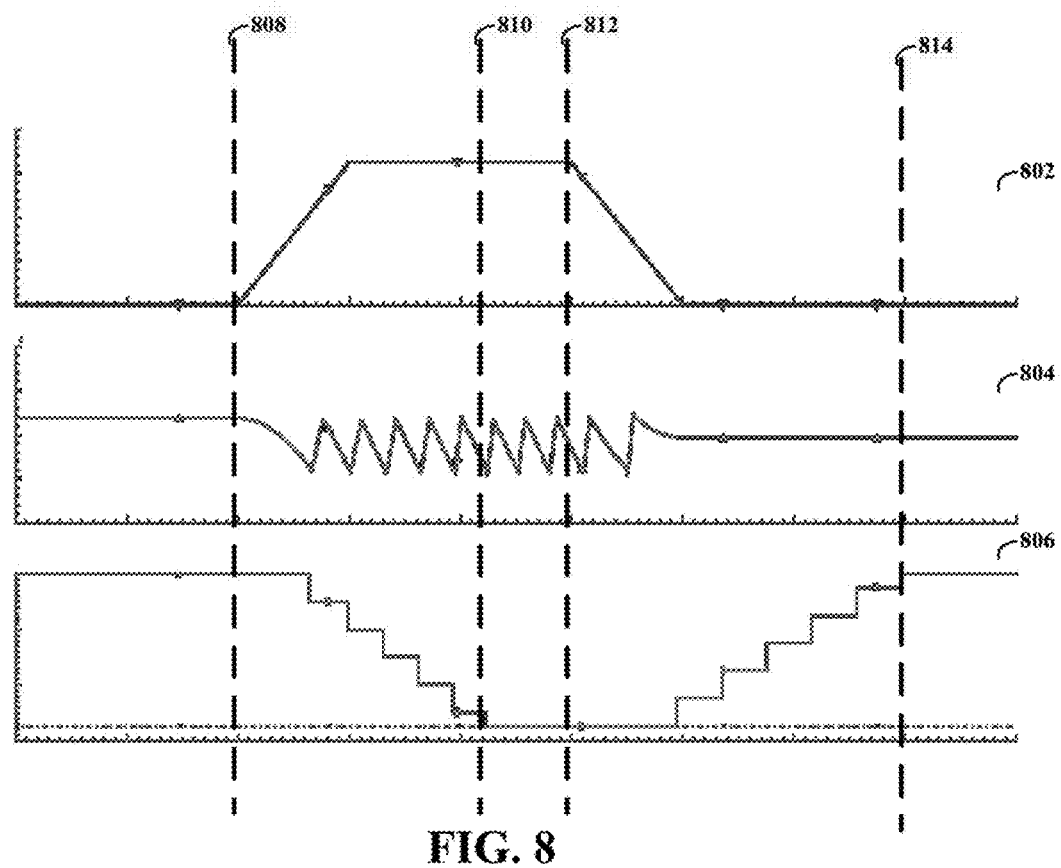
FIG. 8 shows timing diagrams for ON resistance modifications and ripple voltage as a function of load current, consistent with embodiments of the present disclosure.

FIG. 8 shows timing diagrams for ON resistance modifications and ripple voltage as a function of load current, consistent with embodiments of the present disclosure. Timing diagram 802 depicts the load current for the output of a DC-to-DC converter. Timing diagram 804 depicts experimental results for a simulated ripple voltage for the output of a DC-to-DC converter. Timing diagram 806 depicts the actual $R_{on}$ value as adjusted according to a step-wise response (e.g., consistent with the state diagram of FIG. 7).

At time point 808, the load current begins to increase. Increasing the load current results in an increase in the discharge rate, and therefore, also results in a corresponding decrease in the actual $R_{on}$ value. At time point 810, the actual $R_{on}$ value has reached a value that corresponds to the increased current. At time point 812, the load current begins to decrease and therefore results in a corresponding decrease in the discharge rate. The DC-to-DC converter responds by decreasing the actual $R_{on}$ value. At time point 814, the actual $R_{on}$ value reaches a value that corresponds to the new load current level.

The dynamic adjustment to the actual $R_{on}$ value can also be carried out in response to changes in the input voltage $V_{in}$. For instance, increasing the $V_{in}$ value can result in an increase in the charge rate, which affects the ratio between the charge and discharge rates. Such an increase can therefore trigger an increase in the actual $R_{on}$ value.

It is recognized that aspects of the disclosure can be practiced with circuits and computer/processor-based system configurations other than those expressly described herein. The corresponding structure for a variety of these systems and circuits would be apparent from the intended application and the above description.

The various terms and techniques are used by those knowledgeable in the art to describe aspects relating to one or more of communications, protocols, applications, implementations, and mechanisms. One such technique is the description of an implementation of a technique expressed in terms of an algorithm or mathematical expression. While such techniques may be implemented, for example, by executing code on a computer processor, the expression of that technique may be conveyed and communicated as a formula, algorithm, or mathematical expression.

For example, a block or module denoting "C=A+B" as an additive function implemented in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor circuit in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of various methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions, which may be used to program a computer (or other electronic devices) to perform a process according to the present disclosure. Accordingly, the computer-readable medium includes any type of media/machine-readable medium suitable for storing electronic instructions.

Various modules may be implemented to carry out one or more of the operations and activities described herein and/or shown in the figures. In these contexts, a "module" is a circuit that carries out one or more of these or related operations/activities. For example, in certain of the above-discussed embodiments, one or more modules are discreet logic circuits or programmable logic circuits configured and arranged for implementing these operations/activities, as in the circuit modules/modes shown in FIGS. 1-2 and 7. In certain embodiments, the programmable circuit is one (or more) computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

The various embodiments described above are provided by way of illustration only and should not be construed to limit the disclosure. Based on the above discussion and illustrations, those skilled in the art will readily recognize that various modifications and changes may be made to the present disclosure without strictly following the exemplary embodiments and applications illustrated and described herein. Such modifications and changes do not depart from the true spirit and scope of the present disclosure, which is set forth in the following claims.

The invention claimed is:

1. A method for use with a switching direct current (DC)-to-DC converter that operates in a charging mode (loading) that has an ON resistance ($R_{on}$) and a discharging mode (stoppump), the method comprising:
   determining a ratio between a discharge rate and a charge rate, each of the discharge rate and the charge rate: corresponding to a rate of change for an output voltage ($V_{out}$) of the switching DC-to-DC converter that is charged by at least one flying capacitor of the switching DC-to-DC converter, and corresponding to the discharging mode (stoppump) and the charging mode (loading), respectively; and
   adjusting the ON resistance ($R_{on}$) of the charging mode (loading) to change the determined ratio to a target ratio, wherein the ratio between the charge rate and the discharge rate is set to respond to detecting the output voltage of the switching DC-to-DC converter has exceeded, by more than a predetermined amount, an upper voltage hysteresis level by triggering the stoppump mode that disables the charging mode.

2. The method of claim 1, wherein the ratio between the charge rate and the discharge rate is set to maintain the charge rate at a rate at least as high as the discharge rate.

3. The method of claim 1, wherein the ratio between the charge rate and the discharge rate is set to maintain, over a time for the entire discharging mode, a voltage on the at least one flying capacitor that is above the output voltage of the switching DC-to-DC converter.

4. The method of claim 1, wherein the switching DC-to-DC converter has a lower output voltage reference level and the stoppump mode is triggered by an upper voltage reference level.

5. The method of claim 4, further including the steps of:
   generating a pump enable signal responsive to a comparison between the output voltage of the switching DC-to-DC converter and the lower and upper voltage reference levels;
   alternating, in response to the pump enable signal, between the charging mode and the discharging mode; and
   entering the stoppump mode in response to the pump enable signal.

6. The method of claim 1, wherein the step of determining the ratio between the discharge rate and the charge rate includes the use of a current detection circuit.

7. The method of claim 1, wherein the step of determining the ratio between the discharge rate and the charge rate includes incrementally changing the ON resistance of the charging mode in response to monitoring of the pump modes for the switching DC-to-DC converter and at different values of the ON resistance.

8. The method of claim 1, wherein the step of adjusting the ON resistance includes adjusting a voltage supply voltage for metal-oxide-semiconductor field-effect transistors (MOSFETs).

9. A switching direct current (DC)-to-DC converter comprising:
   a charge pump circuit including:
   a flying capacitor; and
   a switching circuit having an ON resistance ($R_{on}$) and configured and arranged to boost an input voltage ($V_{in}$) by operating in each of: a charging mode (loading) during which charge is provided from the flying capacitor to an output voltage ($V_{out}$) of the switching DC-to-DC converter; and a discharging mode (storing) during which charge is not provided from the flying capacitor to the output voltage ($V_{out}$) of the switching DC-to-DC converter;
   a determination circuit configured and arranged to determine a ratio between a discharge rate and a charge rate, each of the discharge rate and the charge rate: corresponding to a rate of change for the output voltage ($V_{out}$) of the switching DC-to-DC converter, and corresponding to the discharging mode (storing) and the charging mode (loading), respectively; and
   an ON resistance circuit module configured and arranged to adjust the ON resistance ($R_{on}$) of the charging mode (loading) and to change the determined ratio to a target ratio, wherein the ratio between the charge rate and the discharge rate is set to respond to detecting the output voltage of the switching DC-to-DC converter has exceeded, by more than a predetermined amount, an upper voltage hysteresis level by triggering a stoppump mode that disables the charging mode.

10. The converter of claim 9, wherein the switching circuit includes metal-oxide-semiconductor field-effect transistors (MOSFETs) for switching between the charging mode and the discharging mode.

11. The converter of claim 10, wherein the ON resistance circuit module is further configured and arranged to adjust the ON resistance by adjusting a supply voltage level provided to the MOSFETs.

12. The converter of claim 9, wherein the ON resistance circuit module is further configured and arranged to adjust the ON resistance in response to detecting modes for the switching circuit.

13. The converter of claim 9, wherein the ON resistance circuit module is further configured and arranged to calculate a desired ON resistance based upon a sensed load current for the output voltage.

14. The converter of claim 9, wherein the target ratio is a one-to-one ratio.

15. The converter of claim 9, wherein the ON resistance circuit module is further configured and arranged to increase the ON resistance in response to an increase in the input voltage.

* * * * *